3,152,056
METHOD OF PRODUCING N—H COMPOUNDS, PARTICULARLY HYDRAZINE COMPOUNDS
Bernhard Berghaus, Grand Hotel Dolder, Zurich, Switzerland, and Maria Staesche, Mattenstrasse 31, Wettingen, Aargau, Switzerland
Filed May 5, 1960, Ser. No. 27,212
3 Claims. (Cl. 204—177)

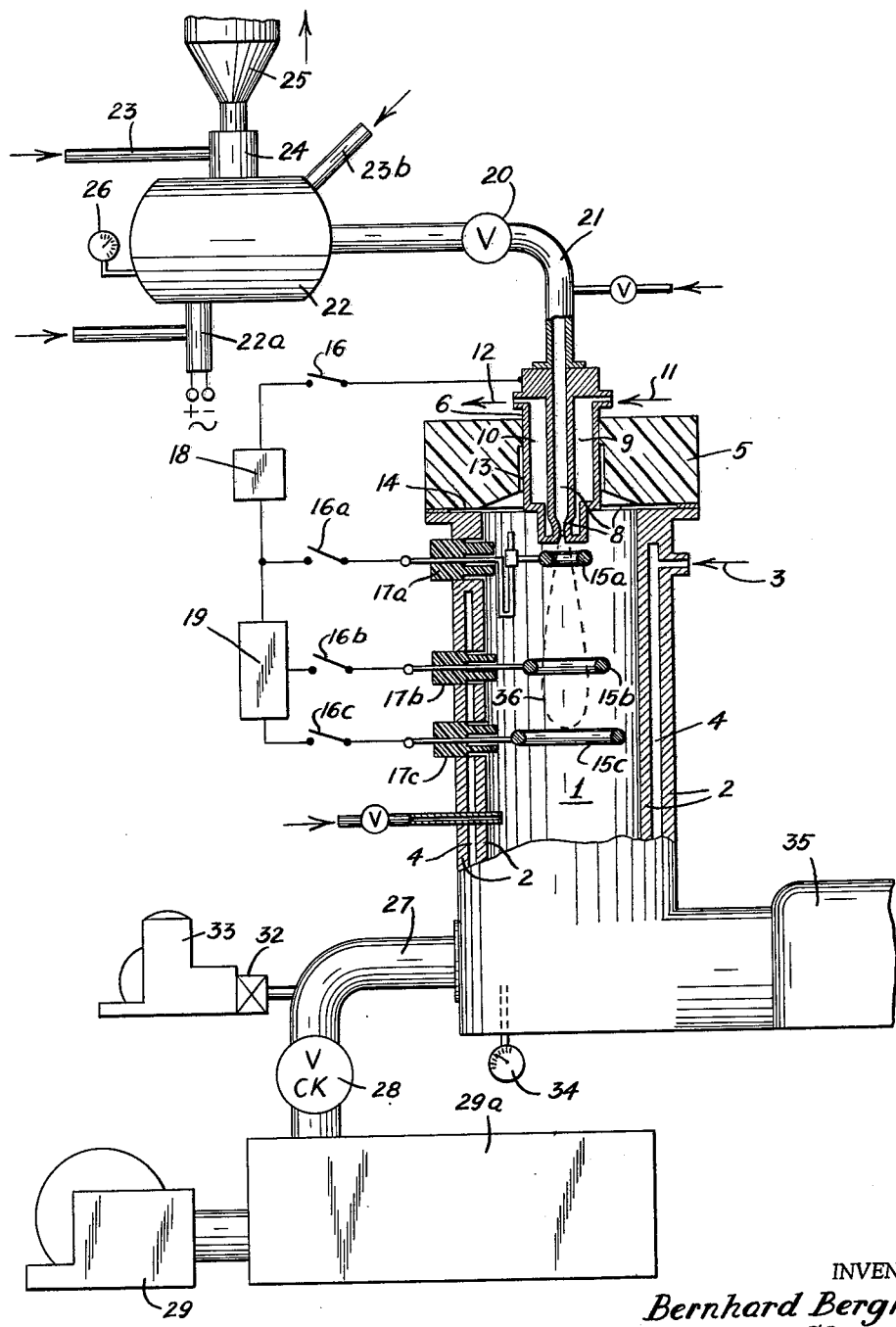

This invention relates to a method of producing, in electric glow discharges, N—H compounds from gases containing $N_2$ and $H_2$ and/or ammonia gas compounds of the same.

Various processes and apparatus are already known in which a glow discharge is produced in a suitable receptacle between electrodes to which a voltage is applied, this glow discharge acting upon a gas current and producing reactions therein. In the known processes of this kind, the electric field operates mostly through layers of insulation on the electrodes but, for thermal reasons, the energy density of the glow discharge formed on the surfaces of the insulating layers, cannot be increased beyond relatively low values. In the case of discharge receptacles in which the electrodes to which a voltage is applied are located freely opposite one another, the energy of the glow discharge is reduced to a glow skin covering the parts to which a voltage is applied. The substances to be treated have to pass through this glow skin unless the low-energy positive discharge column is used. At any rate, the greater part of the energy is set free only in the immediate vicinity of material surfaces. When reactions are carried out on gaseous, vaporous or finely dispersed substances, the presence of such sufaces participating in the process is frequently undesirable; however, energetic gas or glow discharges are not known to take place in the free space between the electrodes. It has been suggested to avoid these difficulties by using high-frequency gas discharges, but this process has not been successful either. Furthermore, the use of independently heated glowing electrodes is permitted only in sporadic individual cases. Another known process of carrying out gas reactions in a narrow gap between metal walls to which a voltage is applied has been unsuitable inasmuch as, owing to the high current resistance, the sojourn time of the reacting substances can be influenced only a little.

For industrial purposes, electrical processes for carrying out chemical reactions have, accordingly, been used to date only with light arc-type discharges which are accompanied by the known disadvantages, such as high temperature, relatively small yield, insufficient purity of the end products etc., also in the case of arcs in flowing gases.

Conversely, this invention relates to a process enabling chemical reactions to be carried out with a good yield without an arc and, therefore, with considerably lower temperatures. The process according to this invention is characterized by the fact that the initial reactants containing nitrogen and hydrogen are introduced into a reaction space to be at least partly dissociated in their gaseous condition and to be reacted one upon the other during a limited period of time so that at least one end product of the general formula $(N_xH_y)_n$ is formed, in which N=nitrogen, H=hydrogen, $x, y, n$=integral numbers 1, 2, 3 etc.

The invention is described in conjunction with a diagrammatic representation of an embodiment of an apparatus for the performance of this process.

The reaction space 1 of the illustrated apparatus is entirely enclosed by metal walls 2. They are designed as double walls permitting a coolant flow to be passed through the space 4 in the direction of the arrow 3. The inner space 1 has an air-tight cover 5 made of an electrically insulating material. The cover carries a metallic supply member 6, of which the inner channel 7 terminating in a nozzle 8 leads into the reaction space 1. The wall enclosing the inner channel and the nozzle is provided with coolant channels 9 and 10 permitting the coolant (e.g. water or liquid air) to pass through in the direction 11→12. The transition points metal/insulating material on the cover 5 are protected in the known manner by the gaps 13 and 14.

An electric field is generated in front of the part of the metallic supply member 6 which extends, with the nozzle 8, into the discharge space. To this end, a ring 15a, adjustable along the nozzle axis, is arranged as a counter-electrode close to the nozzle mouth 8 and supported by the inner conductor of the insulated current supply member 16 which passes through the insulator 17a. The inner diameter of the ring 15a, which is coaxial with the nozzle axis, is large enough so as not to impede a gas jet from emerging from the nozzle mouth. The ring 15a is connected, via the switch 16a, with the one pole of a voltage source 18, while its other pole, via the switch 16, is connected to the input member 6. A direct current source 18 is used preferably with its negative pole supplying, via the switch 16, the supply member. On the other hand, a pole of a voltage source 19 is connected to the switch 16a, e.g. for direct voltage whose centre tap is connected, via the switch 16b and the supply member passing through insulator 17b, to the ring 15b and whose other pole is connected, via the switch 16c and the supply member passing through insulator 17c, to the ring 15c. It has been shown to be of advantage if the electrode 15b is positive with respect to the electrode 15a.

The initial substances, e.g. a liquid spray, perhaps together with a carrier gas, are introduced into the supply member 6 through the tube 21 which can be blocked by a valve 20. In the mixer 22, by means of a high pressure gas current which, via the line 23, passes to the sprayer 24, a finely dispersed distribution is obtained of the liquid contained in the funnel 25, to the end that the clouds of the liquid, together with the carrier gas current, may pass, via the line 21, to the nozzle 8 as soon as the valve 20 is opened. The pressure $P_2$ is indicated by pressure gauge 26.

The bottom of the reaction space is provided with an output member 27 leading, via a check valve 28, to an absorption device 29a and to the pump 29 which is designed in such a manner that a predetermined pressure $P_1$ (read from the manometer 34) can be maintained in the reaction space 1 at the mouth of the line 27 even while a gas current with the pressure $P_2$ is supplied via the nozzle 8. The pump capacity should be so great that it is possible to increase the pressure ratio $P_2:P_1$ to high values.

The end product of the glow discharge process may be removed from the reaction space 1 partly by the absorption device 29a and partly by a suitably delivery device 35 which, however, does not influence the present invention. If the gas supply via the nozzle 8 has a sufficient pressure, a normal atmospheric pressure in the reaction space 1 will suffice so that a pump 29 can be dispensed with.

This process is charcterized by the fact that the reacting substances are introduced into the reaction space 1 in the form of at least one jet 36. To this end, a given pressure $P_1$ is maintained in the reaction space 1, at least in the immediate vicinity of the mouth of the line 27, and, at the same time, a gas current with the pressure $P_2$ is introduced via the nozzle-type opening 8 of the supply member 6. If the pressure $P_2$ at the mouth of the nozzle 8, its inner width and the pump output to line 27 are suitably proportioned, a stationary condition will be obtained with a pressure difference $(P_2-P_1)$ in the reaction space between the mouth of the nozzle 8 and the delivery member 27. As soon as the entering gas current has left the nozzle mouth 8, it adopts the form of a gas jet which may, however, be differently shaped according to the configuration of the nozzle. The jet which is axially symmetrical with the nozzle axis is shown diagrammatically in FIG. 1 by line 36 but, for the sake of clarity, the radial dimension of the spindle-type limiting surfaces is exaggerated with respect to the actual shape. For the same reason, the most frequently occurring deformations of the jet immediately adjacent to the nozzle mouth are not shown either.

If the gas current expands undisturbed inside the reaction space 1, the inidvidual gas particles and the vaporous, liquid or solid particles which are carried along by the jet, will flow through the largest part of the path between the nozzle mouth 8 and the counter-electrodes 15 at high velocity. If the total pressure drop $(P_2-P_1)$ is suitably chosen, the velocity and with it the through-put time of the reacting substances may be set to the desired value within wide limits.

Within the jet, a luminosity develops from the usual glow at the cathode, mostly in the shape of a luminous jet which is structurally different from all the gas and glow discharge phenomena hitherto known. The appearance of the luminous zone seems to be determined by the gas jet but, occasionally, a layer within the luminous phenomena may also be observed. The spectral range of the light emission is determined to a certain extent by the reactions taking place within the jet. The light emitting regions within the jet are, however, not only the parts which come into play for the present purpose of performing reactions; the actual reaction zone may also rather comprise non-luminous parts of the jet as well as its immediate surrounding, and may even extend into the nozzle opening 8.

The shape of the reaction zone conforms largely with the flow velocity of the jet, although the reaction zone need not necessarily extend beyond the same. An essential characteristic of the present discharge form resides in the sharp limits against its surroundings which may be attributed to the steep pressure drop from the inisde to the edge of the jet. As, according to a known law, the energy output of gas discharges increases with the gas pressure according to an approximately cubic function, whereas, at the edge of the jet, the pressure $P_1$ of the receptacle prevails already, it is to be expected that the strongest reaction takes place within the jet where, at the same time, the biggest ion density with a relatively low temperature can be observed. Experience has proved that the reacting substances leaving the jet immediately enter in the nozzle 8 or shortly after leaving the same. The reaction of the individual ions takes place during the time that they are in, and pass through, the jet or zone 36.

The sojourn time in the jet of the reacting substances is usually within the range of fractions of milliseconds to fractions of seconds. This short adjustable action time of the electric field and the fact already mentioned that the reacting substances leaving the jet immediately enter a zone of a different pressure, different concentration and possibly of another temperature, account for the surprising chemical effect of this process.

It is possible by this process to obtain such reacted products as cannot be produced otherwise or only in a much more complicated way. Particularly difficult or even unknown reactions can thus be forced. It is here of particular importance that a retroformation of the generated products is impeded.

If pure ammonia is introduced into the apparatus through the nozzle 8 and if the resulting products are cooled in liquid air, then, besides still remaining undecomposed $NH_3$, a liquid can be found with a melting point of about $-20°$ C. It smells strongly of ammonia and produces the hydrazine reaction together with the p-dimethylamino-benzaldehyde. At a room temperature, this liquid evaporates slowly and, at a temperature of $+30$ to $40°$ C., rapidly; but always completely; while in its fresh condition, it develops a strong gas pressure.

A mixture of $H_2$ and $N_2$ also produces this liquid, besides a small amount of $NH_3$. It is not a pure hydrazine, but a compound of hydrazine and ammonia, as of the type of the hydrazinamine, $N_2H_5.NH_2$, generally $(N_xH_y)_n$.

The small resulting yield is to be considered as a disadvantage of the known processes of producing hydrazine by decomposing ammonia in electric discharges, particularly in glow discharges, if hydrazine itself can be obtained at all.

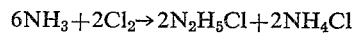

Many experiments have recently been made in order to increase the yield, in particular by shifting the equilibrium $2NH_3 \rightleftarrows N_2H_4+H_2$ to the right which is possible by removing the formed $H_2$, e.g. by unsaturated hydrocarbons (U.S. Patent 2,736,693), or finely distributed platin metal, or also by collecting the formed hydrazine by a suitable reagent, e.g. benzaldehyde, $C_6H_5.CHO$, from which it can be freed again by decomposing with acids. However, these processes have not attained any technical importance as yet.

The classical process of obtaining hydrazine is still that of Thiele-Raschig, i.e. by oxidation of ammonia in aqueous solution with a solution of NaOCl and distillation of the $N_2H_4$ compound obtained. The chief difficulty is the low concentration in which the hydrazine compound is obtained. Numerous tests have been made until very recently in order to enrich it by precipitation (e.g. by cyclohexanone or acetone).

It has now been found that a hydrazine addition compound or possibly an ammonium salt is spontaneously formed from mixtures of $NH_3$ or $N_2+H_2$ which are reacted in a space of a high ion density, as described, with a third reacting substance enabling the formation of a stable compound of hydrazine. According to how the reaction is directed, even more than one hydrazine addition compound may be obtained simultaneously, by way of example: $N_2H_4.HCl$, $N_2H_4.2HCl$, etc.

This third reacting substance may be: a halogen, a metal halide, an anhydride of an oxygen-containing acid, a metal salt of an oxygen-containing acid, nitrogen dioxide, or oxygen. All of these substances are capable of reacting with hydrazine (formed in an atmosphere of $NH_3$ and mixtures of $N_2$ and $H_2$ under the influence of a glow discharge) to produce hydrazine addition products which precipitate. It has been found that with halogens, e.g. $Cl_2$, the following reaction takes place:

$$6NH_3+2Cl_2 \rightarrow 2N_2H_5Cl+2NH_4Cl$$

Other products, such as HCl, $NH_2Cl$ and others, have not been found therein. The completeness of the reaction above all depends upon the degree of ionization and may attain nearly 100%.

As acid radicals there are to be considered mainly: $SO_4$, $SO_3$, $NO_3$, $NO_2$, $ClO_3$, $ClO_4$ and other ions which produce solid sulphate, sulphide, nitrate, nitrite, chlorate, hydrazine perchlorate and other compounds of this type.

As distinguished from the halogens which are elements and can, therefore, be introduced elementarily in the form of a gas, the other salt formers do not exist in a free form, anhydrides excepted, but are bound to hydrogen as acids or to metal as salts.

The introduction of the salt formers as acids has not proved to be advantageous because the water always contained in them causes disturbing reactions. Moreover, free hydrogen is formed, and the acids as such are corrosive.

Considerably better is the introduction of salt formers in the form of metal salts. The respective salts of all the ing to a yield of 80%). By titration with a solution of iodine after Stollé, 5.6 gms. $N_2H_5Cl$ was found in the filtered solution, corresponding to 78% of the theoretical quantity.

*Example 4*

Under the same conditions as in Example 1, a mixture was prepared in the container 22 of 4 parts by volume of $NH_3$ and one part by volume of $NO_2$ which was introduced into the nozzle, via the control member 20 and the line 21, and blown into the reaction space as a jet. A bright lilac luminous jet with a green edge appeared, with a gas throughput of 3 litres a minute, a pressure of 20 to 25 mm., a voltage from 200 to 340 v. and a power of 300 to 400 w., mostly 350 w. An hour later, after having been weighed and titrated with an iodine solution, 18 gms. of a liquid were obtained and found to be $N_2H_5OH$, amounting to a yield of 22% with reference to the employed $NO_2$. The gas which consisted of the excess of $NO_2$, the reacted product NO and $NH_3$, was withdrawn and, after oxidation of the NO and adjustment of the gas composition, was reintroduced into the system via the container 22.

*Example 5*

10 litres $NH_3$ was mixed with 13 litres $O_2$ and, via the nozzle 8, brought into the reaction space in an ionized condition. With a voltage of 185 volts and a power of 104 w., the pressure ranged between 15 and 5 mm. Hg, and a lime-green jet appeared which, beneath the anode, passed into green with blue and, at the bottom of the container, into green with yellow.

8.76 gms. of a deep-blue substance was frozen which on melting at −110° instantaneously flowed together in a red liquid while gas was released which liquid, with further increase of the temperature and by removing a small amount of gas, furnished 6.16 gms. of a slightly yellowish liquid with a softening point of −106° C. and a melting point of −60° C. This liquid contained no free ammonia, but reacted strongly alkaline and showed a large consumption of iodine. Only in its fresh condition did it react to indicate hydrazine. When left alone at room temperature, the liquid developed large amounts of gases and was evaporated completely a few weeks later.

We claim:

1. A process for the production of hydrazine hydrohalide comprising introducing at high velocity under pressure through a metallic nozzle shaped restricted inlet into a reaction zone at reduced pressure a member selected from the group consisting of (1) ammonia gas and (2) at least two gases of the group consisting of ammonia gas, nitrogen and hydrogen and a reactant selected from the group consisting of halogens and metal halides, generating an electric glow discharge in said introduced gas in the form of a jet discharge radiating into the reaction zone axially from said metallic nozzle as one electrode to a point of lower pressure and opposite polarity in said reaction zone; removing the formed reaction mixture rapidly from said zone and separating hydrazine hydrohalide from the withdrawn reaction mixture.

2. A process for the production of hydrazine hydrochloride comprising introducing at high velocity under pressure through a metallic nozzle shaped restricted inlet into a reaction zone at reduced pressure chlorine and a member selected from the group consisting of (1) ammonia gas and (2) at least two gases of the group consisting of ammonia gas, nitrogen and hydrogen, generating an electric glow discharge in said introduced gas in the form of a jet discharge radiating into the reaction zone axially from said metallic nozzle as one electrode to a point of lower pressure and opposite polarity in said reaction zone; removing the formed reaction mixture rapidly from said zone and separating hydrazine hydrochloride from the withdrawn reaction mixture.

3. A process for the production of hydrazine hydrochloride comprising introducing at high velocity under pressure through a metallic nozzle shaped restricted inlet into a reaction zone at reduced pressure titanium tetrachloride and a member selected from the group consisting of (1) ammonia gas and (2) at least two gases of the group consisting of ammonia gas, nitrogen and hydrogen, generating an electric glow discharge in said introduced gas in the form of a jet discharge radiating into the reaction zone axially from said metallic nozzle as one electrode to a point of lower pressure and opposite polarity in said reaction zone; removing the formed reaction mixture rapidly from said zone and separating hydrazine hydrochloride from the withdrawn reaction mixture.

References Cited in the file of this patent

UNITED STATES PATENTS

| | | |
|---|---|---|
| 2,753,300 | Mantell et al. | July 3, 1956 |
| 2,849,356 | Manion | Aug. 26, 1958 |
| 2,849,357 | Devins et al. | Aug. 26, 1958 |
| 2,952,599 | Suchet | Sept. 13, 1960 |
| 3,020,223 | Manion | Feb. 6, 1962 |